United States Patent [19]
Newman

[11] Patent Number: 5,597,597
[45] Date of Patent: Jan. 28, 1997

[54] METHOD OF STERILIZING AN EDIBLE SUBSTRATE WITH UV RADIATION

[76] Inventor: Paul B. D. Newman, Northcote House, Northlew, Okehampton, Great Britain, EX20 3BT.

[21] Appl. No.: 356,378

[22] PCT Filed: Apr. 27, 1994

[86] PCT No.: PCT/GB94/00898

§ 371 Date: Feb. 23, 1995

§ 102(e) Date: Feb. 23, 1995

[87] PCT Pub. No.: WO94/24875

PCT Pub. Date: Nov. 10, 1994

[30] Foreign Application Priority Data

Apr. 27, 1993 [GB] United Kingdom .................. 9308672

[51] Int. Cl.[6] ................. A23B 4/01; A23B 4/015; A23L 3/005; A23L 3/28
[52] U.S. Cl. .................. 426/248; 99/451; 250/453.11; 250/455.11; 422/24; 422/186.3
[58] Field of Search .................. 426/234, 237, 426/248, 412; 422/24, 186.3; 99/451; 250/455.11, 453.11

[56] References Cited

U.S. PATENT DOCUMENTS

| | | | |
|---|---|---|---|
| 2,186,401 | 1/1940 | Bart | 250/453.11 |
| 2,608,487 | 8/1952 | Kauffman et al. | 426/234 |
| 2,627,466 | 2/1953 | Lewis | 426/412 X |
| 4,233,323 | 11/1980 | Sway et al. | 426/248 X |
| 4,776,267 | 10/1988 | Harris | 99/451 |
| 4,877,964 | 10/1989 | Tanaka et al. | 422/24 X |

FOREIGN PATENT DOCUMENTS

| | | |
|---|---|---|
| 753731 | 5/1943 | Germany . |
| 583219 | 12/1946 | United Kingdom . |

OTHER PUBLICATIONS

Hiroharn, JP Abst. 85–010703, Mar. 1983.

*Primary Examiner*—Arthur L. Corbin
*Attorney, Agent, or Firm*—Larson and Taylor

[57] ABSTRACT

An edible substitute is conveyed on a metal mesh conveyor into a treatment cavity wherein all surfaces of the substrate are subjected to UV radiation to sterilize the substrate. A sterilizing unit containing a plurality of UV sources within a tunnel is also provided.

3 Claims, 4 Drawing Sheets

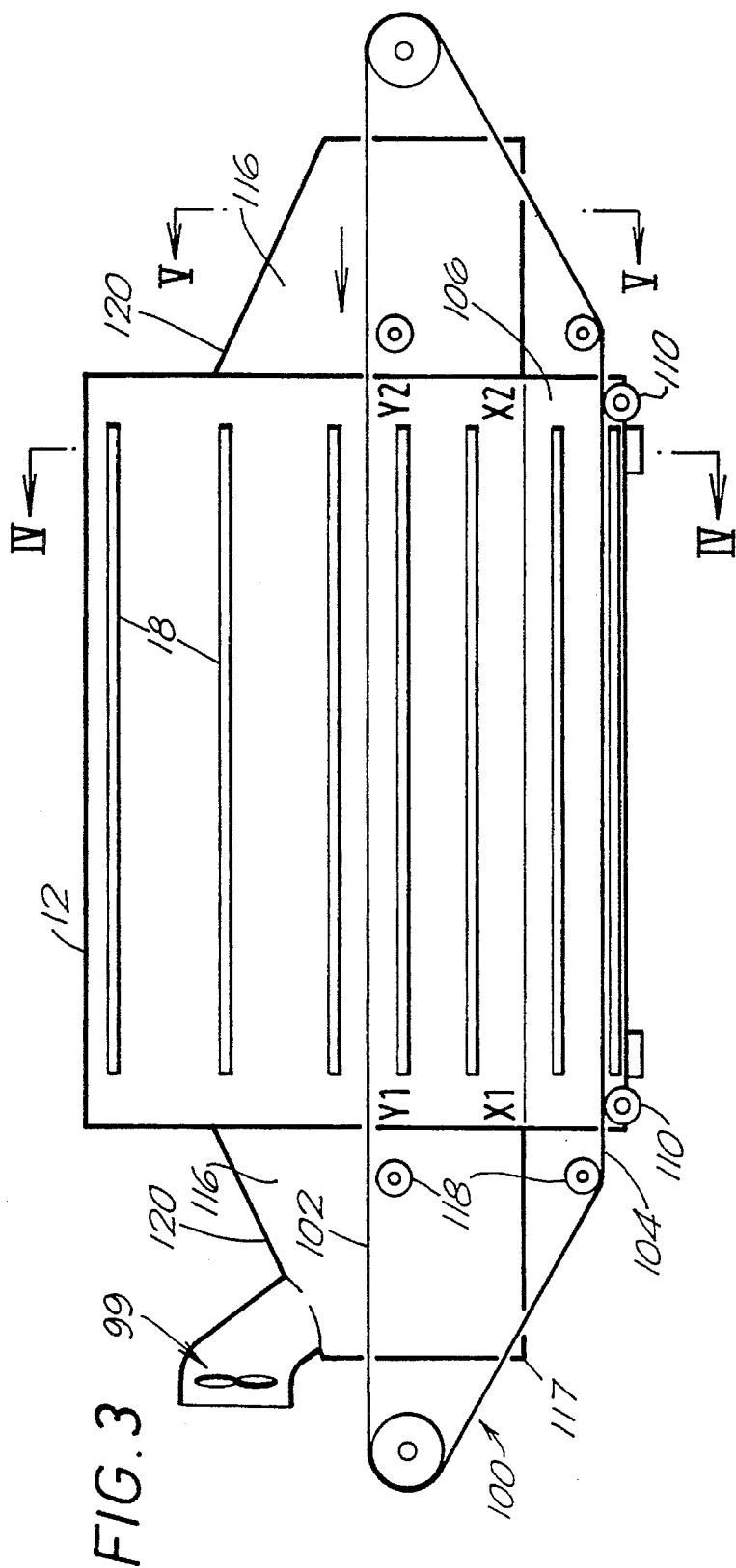
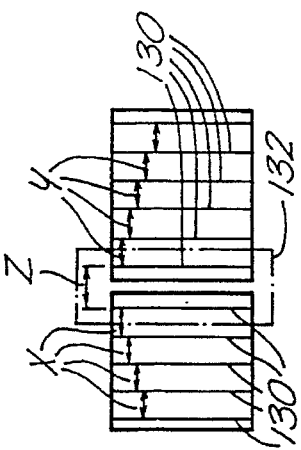
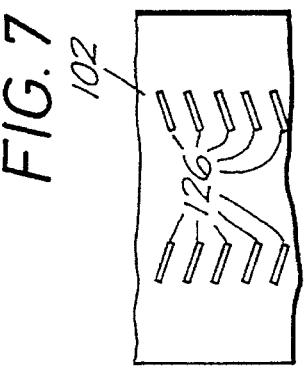
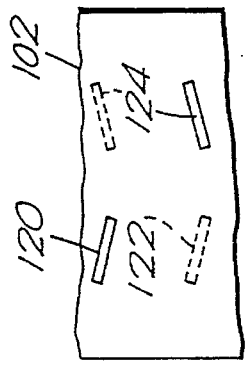

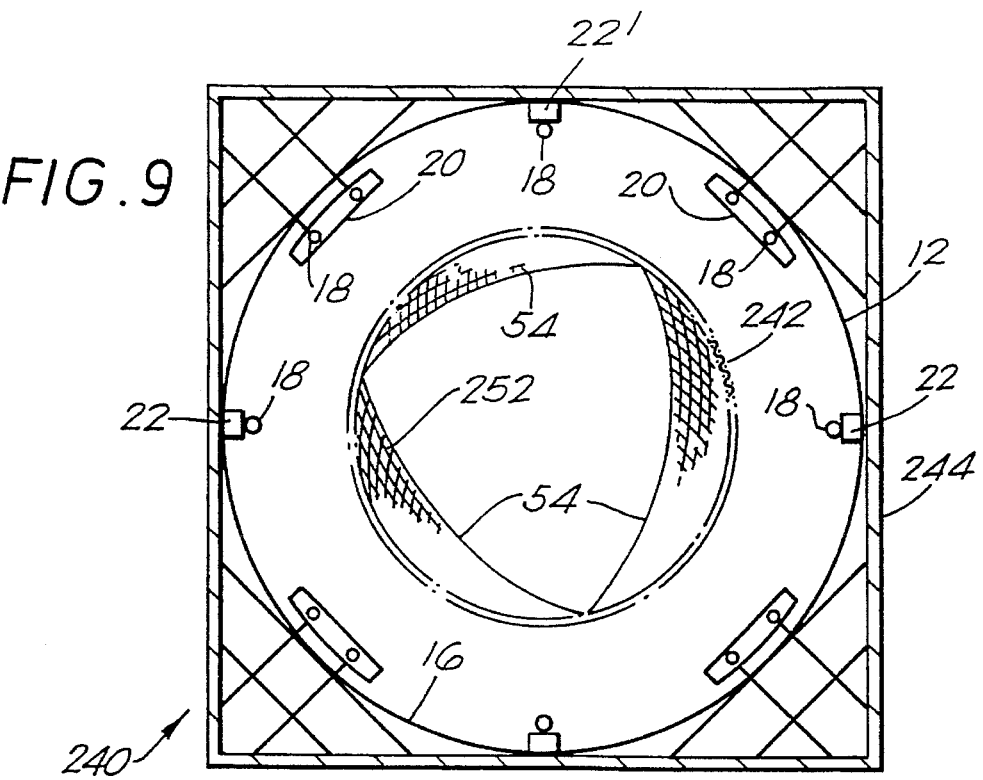
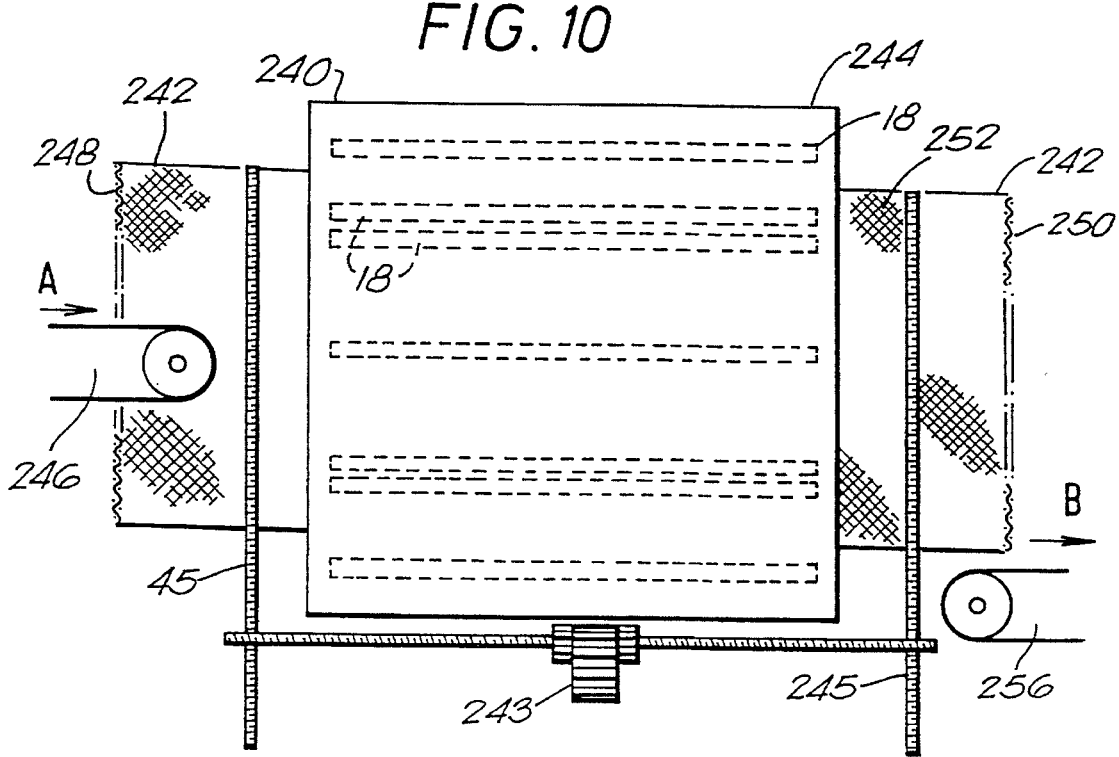

5,597,597

METHOD OF STERILIZING AN EDIBLE SUBSTRATE WITH UV RADIATION

FIELD OF THE INVENTION

This invention relates to a method and apparatus for reducing the microbial load, e.g. on foodstuffs, especially fresh and processed meats. It also relates to apparatus for near-aseptic packaging of foodstuffs, and the in situ sterilisation of food processing equipment.

BACKGROUND OF THE INVENTION

The main determinant of the shelf life of many foodstuffs stored at ambient or chill room temperatures is microbial spoilage. The rate at which food deteriorates through the action of microbes is governed by a great variety of factors, both intrinsic and extrinsic. Generally, however, the single greatest factor that determines the rate of microbial growth (and hence the shelf life of the foodstuff) is the total number of microbes present on the foodstuff when it goes into store. In order to maximise shelf life, it is important to ensure that the foodstuff is exposed to as low numbers as possible of microbes.

Good practice in the food industry therefore demands scrupulous attention to cleanliness of raw materials, handling equipment and work surfaces, packaging, and, perhaps most importantly, personnel. Hygiene is also important from a public health point of view: many foodstuffs provide excellent substrates for the proliferation of pathogenic micro-organisms, which can lead to food poisoning as a direct result of transmission of the microbes from the foodstuff to the human consumer, and/or through the action of toxins produced by the microbes on the foodstuff as a by-product of their growth.

Meat is a prime example of a foodstuff in which microbial growth is of tremendous importance, because it is an excellent substrate for and transmitter of food poisoning organisms. Although the animal muscle that is the forerunner of a cut of meat is itself essentially sterile in a healthy animal, post-slaughter microbial contamination is inevitable. Typically, the process of breaking down a carcass of a meat animal to portions suitable for consumption or further processing involves many separate operations, many of which are still carried out manually. This is true for whole-meat cuts, such as steaks, chops, roasting joints, etc, but is enhanced if the meat is to be further processed, where frequently comminution will occur which by its very nature increases the surface area of the meat that can be in contact with microbe-harbouring machinery and work surfaces. Several economically important groups of meat products include during the course of their manufacture microbicidal or microbistatic factors: among the most noticeable being cooking, mixing with curing salts, and reduction of available water (for example through drying); despite this, such foodstuffs are all too frequently implicated in food poisoning outbreaks, when recontamination of the foodstuff after processing is often blamed. Cooking of any meat cut or product will reduce microbial numbers, the effect being largely determined by the combination of the temperature reached during the cooking process, and the overall time/temperature history, but the self-evident changes that heat treatment of this sort bring about in the meat itself limit the potential for using heat as a method of reducing microbial numbers. Nevertheless, it has received wide spread application, in particular for the development of food products with a very long shelf life. Usually such products have a very high fluid content, facilitating dosage of the combined foodstuff in aseptic packages.

It has long been known that irradiating foodstuffs with ultraviolet rays, especially with wavelength of 235–280 nm, can be used for reducing the microbial load on foodstuffs. This effect has achieved some commercial success in the large scale storage of certain foodstuffs, especially cheeses and other dairy-based products, where comparatively large quantities of the foodstuff are stored chilled under constant ultraviolet irradiation. This can be particularly beneficial for foodstuffs where mould and other fungi are the primary causes of spoilage. In these circumstances, the conditions of ultraviolet radiation have been selected primarily to hinder the growth of microorganisms, rather than eliminate them.

Ultraviolet light is only effective on the surfaces of foodstuffs, since it has very little penetrative power. This inability of ultraviolet radiation to penetrate far into any material is possibly the root cause of the comparatively modest success of ultraviolet treatment generally in the food industry. Most non-liquid foodstuffs have convoluted surfaces with multiple invaginations which harbour microbes that cannot be reached by UV irradiation. The vast majority of packaging materials currently in use in the food industry are generally effective barriers to UV penetration; packaging materials typically used in the meat industry, for example, may only allow about 5% of the UV irradiation falling upon their surface through to the packaged meat. This general opacity to ultraviolet light of most packaging materials in the food industry limits the potential of processes which seek to utilise the microbial reductive powers of ultraviolet irradiation on packaged foodstuffs. UV-transmissible food-grade packaging materials do exist, but their total use in the commercial market place is not high.

Tanaka (U.S. Pat. No. 4,983,411) teaches vacuum packing raw meat in a UV transmissible film, exposing the vacuum packed meat in its package to ultraviolet irradiation, and then shrink-wrapping the package around the raw meat in a high temperature atmosphere. Tanaka therefore proposes packaging, followed by sterilization. The present application addresses the sterilisation of a foodstuff with subsequent packaging, and the packaging of foodstuffs under conditions which maintain the microbially reduced status of the foodstuff after irradiation in an efficient, simple, and cost-effective way. Tanaka uses broad-spectrum UV-radiation, including long-wavelength radiation (300 nm and greater). Such radiation penetrates packaging film relatively easily but is not very effective at impairing or killing microorganisms. Any such activity is likely to be non-specific, e.g. relying largely on a heating effect. Such irradiation is likely to have deleterious effects on meat quality, e.g. associated with photochemical oxidation of lipids and/or pigments.

Vacuum packaging of meat can often induce the meat to "weep"; that is, a fluid is drawn from within the meat pieces by the vacuum and collects between the meat surface and the inside of the packaging. Weep extruded onto the meat surface can inhibit the transmission of UV-radiation, thereby reducing the effectiveness of UV-irradiation of vacuum packaged meat as a system for reducing microbial numbers.

Another potential drawback limiting the widespread application of ultraviolet irradiation for reducing microbial loads on meat and meat products, and other foods, is the potentially deleterious effect on colour and lipid oxidation. This latter aspect is likely to be enhanced by the smearing of adipose tissue on the inner surface of UV-transmissible bags that are heat shrunk following evacuation of the air.

A further barrier to the commercial success of UV irradiation processes for reducing microbial numbers on foodstuffs has been the expense associated with the dedicated equipment required.

SUMMARY OF THE INVENTION

The present invention provides a method of sterilizing a substrate comprising conveying the substrate in a non-wrapped state into a treatment cavity and subjecting substantially its entire surface to UV irradiation. A preferred process for reducing the microbial load on the surfaces of unpackaged foodstuffs, comprises placing the foodstuff on an apertured or UV-transmissive foodstuff supporting means, locating said supporting means (generally centrally) in a cavity (e.g. a chamber or tunnel), and exposing the foodstuff and the supporting means to U.V. radiation from a plurality of U.V. sources distributed around the walls of the cavity and directed radially inwardly towards the centre of the cavity so as to provide irradiation from all directions, including irradiating the underside of the foodstuff supporting means and the underside of the foodstuff through the apertured or UV-transmissive supporting means. The term "centrally" is to be understood as meaning a substantial space exists below the foodstuff supporting means as well as above it. In a preferred embodiment, an apparatus for effecting the present invention comprises a tubular, preferably cylindrical chamber, having a plurality of UV lamps set in, attached to, or depending from the wall or walls of the chamber. This basic design can be utilised as a batch microbial reducing apparatus by having a static support grid (as the foodstuff supporting means) at about midheight of the cylinder. The relative positioning of the UV lamps and the support grid is such as to ensure that all surfaces of the foodstuff, and the upper and lower surfaces of the static, grid, receive preferably similar amounts of ultraviolet irradiation. The effect of "shadows", caused by bars of the grid coming between the lower surface of the foodstuff when supported on the grid and the ultraviolet radiation, can be minimised by providing at least one of the UV lamps with means for moving the lamp circumferentially without interrupting irradiation. A minimal contact area between the foodstuff and the support means may be acceptable with either a static support means (as in some batch systems) or a conventional conveyor, or means can be provided for shifting the foodstuff during irradiation; for example, by shaking, rocking, or vibrating the foodstuff supporting means. Such means are not normally used in conjunction with a foodstuff supporting means that is UV-transmissive, of course.

The process may be applied in-line, for example by providing a conventional metal mesh food grade conveyor as the foodstuff support means instead of the static support grid. The conveyor normally extends outside of the chamber or tunnel so that the foodstuff can be more conveniently placed on the conveyor surface. A variable speed conveyor is preferred, for controlling irradiation times.

Means may also be provided within the chamber or tunnel for displacing the foodstuff during irradiation sufficiently to expose to irradiation the areas of the lower surface of the foodstuff initially in contact with the foodstuff supporting means. When the foodstuff supporting means is a conveyor, satisfactory displacement can be caused by the provision of guides or baffles which displace or turn the foodstuff on the conveyor. Alternatively or additionally the area of the lower surface of the foodstuff initially in contact with the support conveyor can be exposed to irradiation by transferring the foodstuff within the tunnel during irradiation from the first foodstuff supporting conveyor to a second conveyor, the interstices of the mesh of the second conveyor being staggered relative to the first. The transfer of the foodstuff from one belt to another can also be arranged such that the foodstuff is inverted during transfer so that the former lower surface of the foodstuff now becomes the upper surface. This arrangement can provide effective irradiation of all surfaces irrespective of initial contact points, and therefore there is no need for the interstices of the two belts to be staggered.

In a preferred embodiment, the foodstuff supporting means is provided by a screw or auger type of conveyor, comprising a rotatable conveyor tube with perforated walls to allow U.V. transmission, located within and extending lengthwise of the tunnel and having within the tube auger vanes or baffles to convey material within the tube from one end to the other as the tube rotates. Suitable choice of screw pitch of the auger vanes or baffles, and possibly inclination of the conveyor axis, can ensure that individual items of foodstuff can be moved in a gentle "tumbling" manner, thereby continuously exposing new surfaces of the foodstuff to the radiation from the UV lamps. Systems of this sort are particularly well suited for reducing microbial numbers on meat trimmings (for example for beef burger manufacture), while on a different scale the same basic design can be applied to primal cuts of meat.

In another embodiment of the invention, the unpackaged foodstuff, especially meat primals, may be supported on the inner surface of a cage, the cage being further provided with means for rotating the cage and the foodstuff contained therein. Rotation of the cage causes the foodstuff supported on the inner surfaces of the cage to tumble, repeatedly exposing fresh surfaces to UV irradiation from the lamps of the chamber or tunnel. Apparatus utilising the rotating cage approach for alleviating the effects of contact points can be designed as either batch or in-line processes.

A feature of the present invention is that it is not only the foodstuff which receives microbial reducing irradiation, it is also the foodstuff supporting means. A chamber or tunnel embodying the present invention can be constructed quite easily and economically, but it is nevertheless a versatile apparatus. It can contain and irradiate many types of equipment commonly found in the food industry, sterilising the surfaces of the equipment likely to come in contact with foodstuffs. This in situ sterilisation can greatly reduce recontamination caused by such equipment.

In another aspect of the invention there is provided a process for the reduction of microbial load on the surface of unpackaged foodstuffs in combination with the subsequent packaging of the irradiated foodstuff, comprising placing the foodstuff on an apertured or UV-transmissive foodstuff supporting means;

passing the foodstuff through a first chamber of an irradiation tunnel, the tunnel having a plurality of U.V. sources distributed around the walls of the tunnel and directed radially inwardly towards the centre of the tunnel so as to provide irradiation from all directions, including irradiating the underside of the foodstuff supporting means and the underside of the foodstuff through the apertured or UV-transmissive supporting means; and then passing the irradiated foodstuff directly from the first chamber of the tunnel to a second chamber of the tunnel, the second chamber being a packaging chamber, and packaging the irradiated foodstuff, such that the irradiated foodstuff remains in an irradiation condition throughout.

In an embodiment, the apparatus comprises a tunnel having a first chamber and a second chamber, the two chambers linked end-to-end coaxially, the tunnel having a plurality of UV sources distributed around the walls of the tunnel and directed radially inwardly towards the centre of the tunnel so as to provide irradiation from all directions, foodstuff supporting means located at least partially within the first chamber, and means for transferring foodstuff after irradiation from the first chamber to the second chamber, the two chambers being in biologically sealed end-to-end relationship whereby the foodstuff can move from one chamber to the other without biological contamination. Preferably, the tunnel is formed by modular chambers linked end-to-end.

In another aspect of the invention there is provided a sterilizing unit for sterilizing the surfaces of food processing equipment, comprising a chamber or tunnel having a plurality of UV sources distributed around the walls of the chamber or tunnel and directed radially inwardly towards the centre of the chamber or tunnel so as to provide irradiation from all directions. The invention also provides a sterilizing unit for the sterilization of sausages during the splitting and removal of casings, comprising a tunnel or chamber as just described, within which is a means for removing the casing of the sausages, such that the sausages remain in an irradiated condition throughout the removing of the casings.

In general the present invention makes use of UV radiation that falls essentially exclusively in the wavelength range 220–300 nm, preferably at least substantially in the range 235–280 nm and more preferably 250–275 nm. This means that the radiation is highly effective against microorganisms, but has little tendency to harm foodstuffs due to photooxidation or heating.

BRIEF DESCRIPTION OF THE DRAWINGS

The invention will now be described with reference to the Figures in which:

FIG. 3 is a side elevation of a second embodiment which employs a belt conveyor;

FIGS. 6, 7 and 8 are schematic plan views of alternative conveyor arrangements for the second embodiment;

FIG. 9 shows a cross-section of a third embodiment which employs a rotary drum conveyor; and FIG. 10 is a side view of the apparatus shown in cross section in FIG. 9.

SUMMARY OF THE INVENTION

Figure 1:
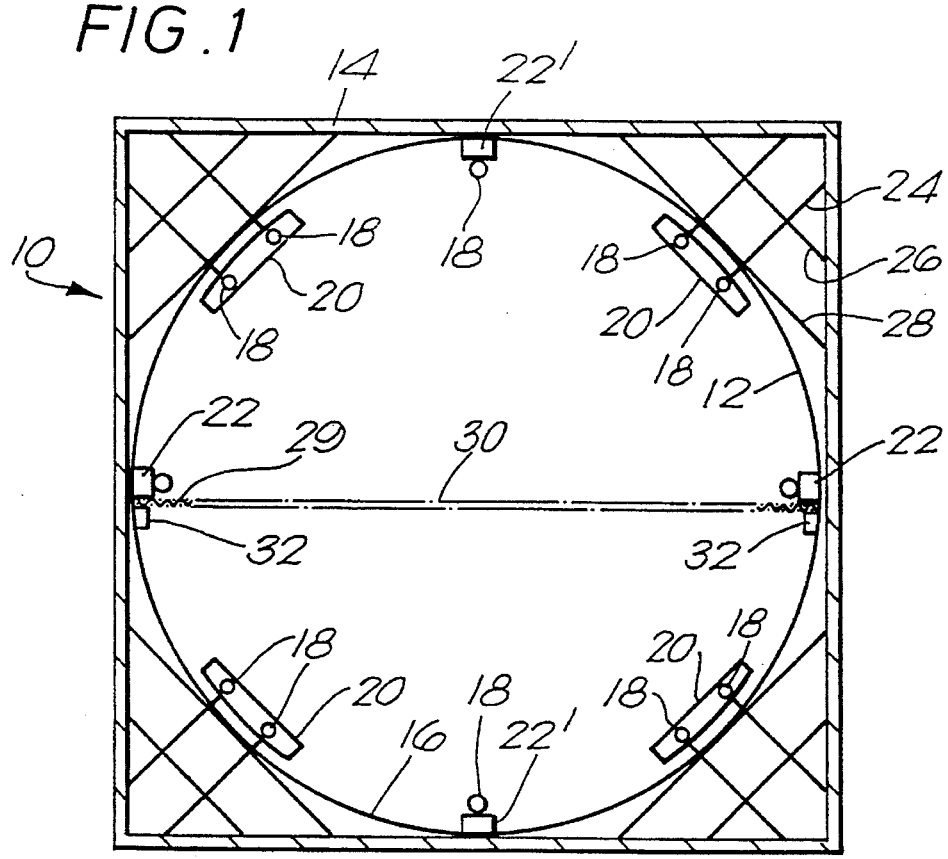
FIG. 1 shows a cross section of a first embodiment of art apparatus of the present invention, suitable for batch processing.

The apparatus shown in FIG. 1 is quite suitable for reducing microbial numbers on foodstuffs commercially as a small-scale batch processing system. The same basic design has been used to provide an experimental rig for evaluating the effects of varying process parameters in a systematic way; some of these experiments are reported here.

Referring first to FIG. 1; apparatus 10 has a cylinder or tunnel 12 supported within and by frame 14. Frame 14 is suitably made from 2" (5 cm) angle iron. Cylinder 12 has a reflective inner surface 16. In the experiments described later the reflective surface was provided by polished zinc; other suitable surfaces include polished metals (such as steel or aluminium) or coatings such as magnesium carbonate. The reflective inner surface 16 helps to ensure that all surfaces of the foodstuff to be irradiated receive comparable amounts of UV irradiation, as well as helping the energy efficiency of the apparatus as a whole. In practice, a reflectivity in excess of 65% is desirable; a polished zinc surface can achieve about 80% reflectivity, polished aluminium about 85%, while the correct selection of magnesium carbonate/oxide coating can achieve about 70%. However, in commercial use including frequent wash-down cycles, a magnesium carbonate/oxide coating may well be preferred because, despite its reflectivity being initially somewhat low, that reflectivity will be maintained for longer. This also means that fewer adjustments need to be made to other processing parameters which affect the amount of radiation that a foodstuff receives, such as dwell time within the tunnel and distance of the UV lamps from the foodstuff, in order to ensure a constantly effective reduction in microbial numbers.

The reflective surface 16 can be smooth, or if desired it may be sculptured to enhance and/or direct the reflected radiation.

Figure 2:
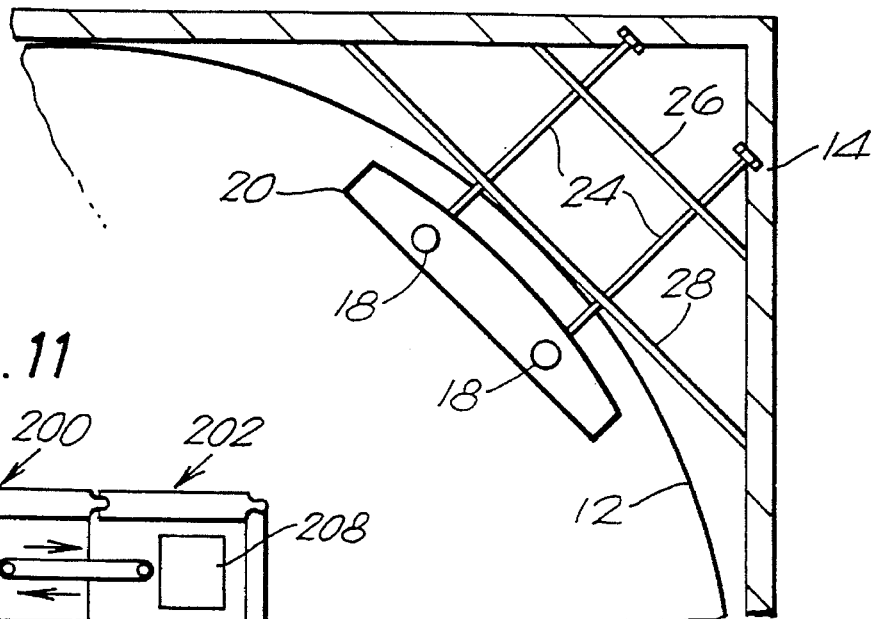
FIG. 2 is a close-up view of the region between points A—A in FIG. 1, the region of mounting one lamp holder.

The ultraviolet irradiation is provided within cylinder 12 by twelve high intensity fluorescent UV tubes 18 arranged in four twin tube holders 20 and four single tube holders 22,22'. The four twin tube holders 20 are located at the corners of frame 14 and (as shown in FIG. 2) are attached to it by rods 24 provided with fixing screw-thread top and bottom. Rods 24 pass through and are supported by rod supports 26 & 28 in normal use, but the design also allows unit 20 to be moved inwardly towards the cylinder centre by detaching the ends of rods 24 from frame 14 and relocating and fixing them in either rod support 26 or rod support 28.

The food to be irradiated is placed on upper surface 29 of support grid 30. Grid 30, which is typically made of 50 mm mesh, is held within cylinder 12 at about midheight of the cylinder by location bars 32 which run most of the length of cylinder 12.

Figure 4:
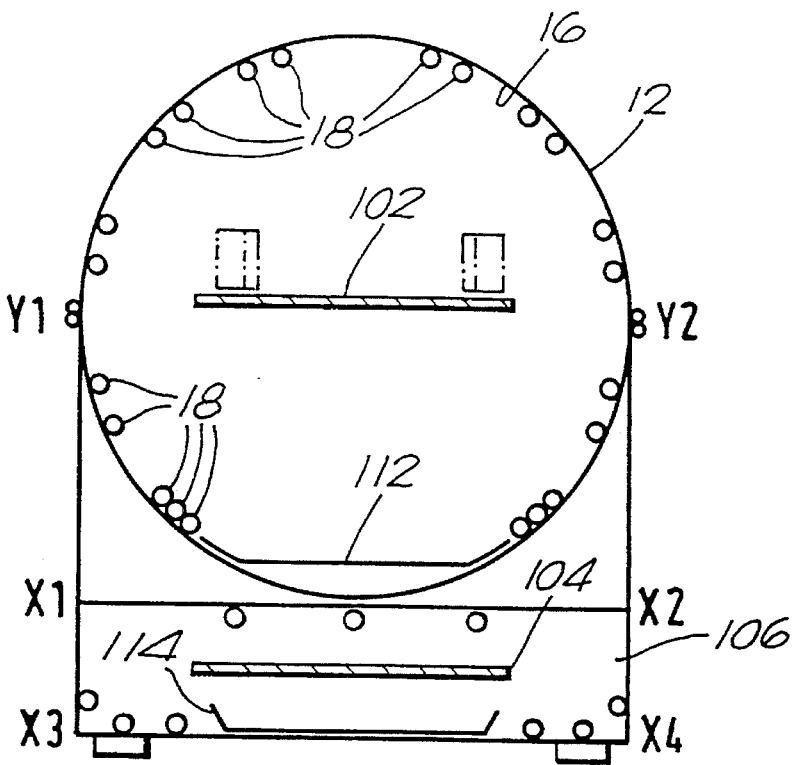
FIGS. 4 and 5 are sections on IV—IV and V—V respectively in FIG. 3.
Figure 5:
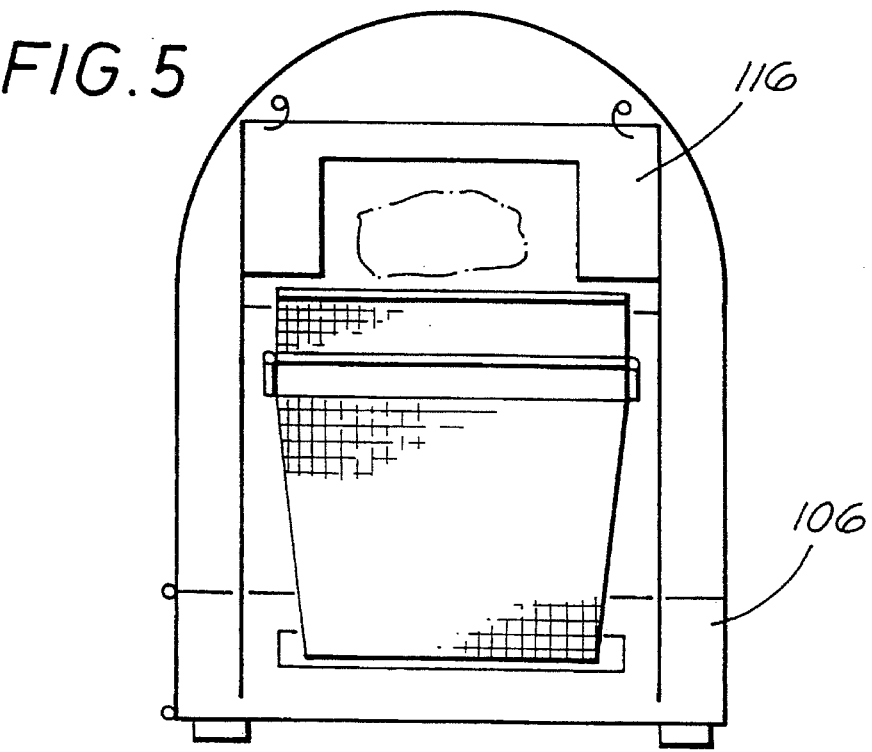

With one type of in-line commercial unit, the grid 30 and location bars 32 are replaced by a metal mesh conveyor. This is shown in FIGS. 3–5. As in the first embodiment, the irradiation cavity is a cylindrical tunnel 12 with a UV-reflective inner surface 16, suitably provided by a magnesium carbonate/oxide coating. A multiplicity of UV tubes 18 are mounted in the tunnel 12 adjacent the surface 16. There may be a greater number than in the static embodiment. Cooling means, e.g. using a fan 99, may be provided. A conveyor belt 100 extends through the tunnel 12, projecting at both ends. Its upper, conveying run 102 is in the central region of the tunnel, spaced from the surface 16 and the UV tubes 18. Its return run 104 may pass beneath the tunnel, through a lower chamber 106 of a support structure 108. The chamber 106 and tunnel may hinge open so that the conveyor assembly can be removed for cleaning repair or replacement (by a different conveyor or by a static grid). To facilitate this, the conveyor assembly may be mounted on rollers 110. Drip trays 112, 114 are provided beneath both runs 102,104. The tunnel may open at Y1 and hinge at Y2, while the chamber 106 opens at X3–X4 and hinges along X1–X2.

At each end of the tunnel there are shrouds 116 to minimise escape of UV, suitably having matt black internal surfaces. The upper surfaces 120 slope downwardly away from the tunnel. The side faces 117 may extend downwardly to protect the conveyor rollers 118 from debris and act as guards for workers. The size of the entry and exit apertures may be adjustable by replaceable or slidable panels.

A wide mesh for the conveyor is preferred as this will minimise contact points between the foodstuff and the conveyor. To achieve maximum practical increase in shelf-life and ensure satisfactory reduction in microbial numbers it is usually desirable to provide some means of exposing to the UV radiation the contact points, that is, the areas of the foodstuff initially in contact with the mesh. Such exposure can be effected in a variety of ways dependent to some extent on the foodstuff being irradiated.

A simple but effective way of achieving such exposure passively is to provide within tunnel 12 guides or baffles arranged so that the lowermost surface of each guide is close to, but does not touch, the upper run 102 of the conveyor thereby partly impeding the forward movement of a foodstuff and directing its movement laterally with respect to the surface of the belt. FIG. 6 shows baffles for use when the conveyor bears large items, as seen in FIG. 5. Thus after an item has travelled some distance through the tunnel it encounters an angled baffle 120 which shifts it laterally by a short distance. A laterally spaced baffle 122 may be provided to limit the displacement. There may be further baffles(s) 124 downstream. FIG. 7 shows the use of greater numbers of baffles 126, appropriate when the conveyor carries small discrete items. Preferably the baffles are part of the conveyor assembly and removable with it for cleaning.

Another way of exposing the initial contact points to irradiation is to provide within tunnel 12 a second continuous belt conveyor in series with the first, the interstices of the mesh of the second belt being staggered relative to those of the first. This is shown in FIG. 8, when the transverse bars 130 of the grids of two conveyors 100,101 are shown. The first conveyor has a grid spacing x; the second conveyor has a grid spacing y which may be the same or different; and the spatial relationship is such that the distance z between adjacent bars on the two conveyors is different from x and y. Thus as the foodstuff transfers from the first belt to the second, the stagger results in new contact points between the foodstuff and the second belt, thereby exposing to radiation the contact points that formerly existed between the foodstuff and the first belt. Alternatively or additionally the juxtaposition between the first and second belts may be such that the foodstuff is inverted by the transfer from one belt to the other; in this way the new contact points are between the belt and a surface of the foodstuff entirely different from that in contact with the first belt. Such an arrangement is especially suitable for comparatively "flat" food such as steaks and patties. In FIG. 8 an inverter arrangement is schematically indicated at 132.

The dimensions of the apparatus may be determined by the field of use. Typically a tunnel will be about 8 feet (240 cm) long. Conveniently, tunnel portions are provided in modular units, e.g. 4 feet (120 cm) long, adapted to be joined head-to-tail to create desired lengths. Thus a unit may have 'male' and 'female' ends, as is shown schematically in FIG. 11. The tunnel diameter may be 4 feet (120 cm), enabling the spacing of UV tubes from the belt to be about 18 inches (45 cm). A suitable belt width is then 27 inches (68 cm).

A completely different approach to eliminating the potential problem of contact points is to move the foodstuff through the irradiation tunnel by way of a screw or drum conveyor. Devices of this kind are well suited for conveying meat trimmings through an irradiation tunnel, repeatedly exposing new surfaces of the trimmings to irradiation. On a larger scale, a screw conveyor is also suitable for conveying primal cuts through an irradiation tunnel.

FIGS. 9 and 10 illustrate an apparatus which embodies this approach. The apparatus 240 shown in FIG. 9 is essentially the same as that shown in FIG. 1, but with a drum 242 replacing grid 30. The drum 242 is rotatable through the action of a motor and gear box 243 driving helical gears 245, although a drive belt, meshed gears, or other similar mechanism could be used. Food to be irradiated within the chamber 244 is introduced into the inside of the drum 242 by way of a conventional conveyor 246 conveying in direction A shown by the arrow. The entrance 248 to drum 242 is in this example located outside chamber 244. Drum 242 has a slight fall from entrance 248 to exit 250 in order that the material falls from input side to output side.

Drum 242 may be a simple grid structure, the diameter of the mesh of the grid forming the walls 252 of drum 242 being determined by the size of the items of foodstuff intended to be irradiated. Thus, smaller items of foodstuff will require a smaller mesh to retain them within the drum; however, a smaller mesh will tend to reduce the effective radiation from UV tubes 18 (shown as broken lines in FIG. 10) reaching the foodstuffs within the drum. Dwell time of the foodstuff can in these circumstances be increased by reducing the fall of drum 242 between entrance 248 and exit 250, or by slowing the speed of rotation of the drum 242, or both; another option is to include baffles within the drum 242 to delay the passage of the foodstuff through the apparatus. Spirally arranged mesh baffles 254 not only slow the rate of throughput of foodstuffs through the chamber, but also guide the foodstuffs along drum 242 in a truly spiral fashion which enhances the evenness of radiation reaching the foodstuff's surface. On leaving the irradiating chamber 244, the foodstuff is transferred from exit 50 of rotating drum 242 onto a second conventional conveyor 256 conveying in direction B shown by the arrow.

FIGS. 1 to 10 illustrate apparatus utilising a basic design of irradiating chamber. This design allows for considerable adjustment of the amount of energy striking the foodstuff by selecting the number of lamps used, the distance of those lamps from the foodstuff, and the length of time that the foodstuff spends within the apparatus ("dwell time"). If more energy is needed, repeating units of similar design can be linked. Units may be similarly linked to provide multi-function systems, for example by sequentially combining reducing the microbial load on meat cuts with automated packaging inside the tunnel, with continual UV irradiation of all packaging equipment, packaging, and foodstuffs.

Example 1 : Experimental results

The effect on microbes on the surface of meat pieces of UV irradiation within an irradiation tunnel of the present invention is illustrated in the following tests.

The tests were all undertaken using a test rig similar to that shown in FIG. 1 & FIG. 2. The UV lamps used for all tests had a high UV-C output, with a spectrum showing a narrow peak at 253.7 nm. This peak accounted for 95% of the output of the lamps. Nominally, each of the lamps used had an average energy output at 253.7 nm of 32 w, equivalent to an intensity of approximately 2.8 w/m$^2$ at one meter distance from each lamp. However, this figure probably indicates the maximum achievable, and is likely to fall off by at least 6% within the first 10 hours of use. As indicated above, the reflectivity of the inner surface of the tunnel, and the distance from each lamp to the surface of the foodstuff, will also affect the amount of energy striking an object.

Temperature and humidity within the tunnel also affect energy dissipation. These factors, and others, make it difficult to provide an accurate prediction of the energy striking objects such as the samples used in this experimental trial, or foodstuffs in the commercial application of the invention.

The surfaces of samples of meat were sterilised with UV in the irradiation tunnel using conditions derived from a series of preliminary experiments. Onto the sterile surface of each meat sample was then spread an inoculum of either a) hererogenous microbial culture, obtained by swabbing commercial cuts of meat and then growing the contents of the swabs in broth; or (b) a culture of *Escherichia coli* (*E.coli*), a microbe responsible for a recent outbreak of food-poisoning in the U.S.A.

Samples were then allocated to a combination of exposure time and number of irradiating lamps. Two, 4, 8, or 12 lamps were used arranged as follows:

2 lamps: single tube holders 22 (see FIG. 1)
4 lamps: single tube holders 22, 22'
8 lamps: twin tube holders 20
12 lamps: tube holders 20,22,22'.

Inoculated samples not subsequently irradiated with UV were used as controls to assess the effect of the irradiation tunnel.

The effect of the UV irradiation tunnel on the samples inoculated with the heterogeneous microbial culture is shown in Table 1. In Experiment 1, successive logarithmic reduction in microbial numbers was achieved with 5 and 10 second exposure to UV from 4 lamps and no growth was observed from samples exposed to 4 lamps for 20 seconds or more. No growth was observed from any of the samples exposed to UV from 8 or 12 lamps for 5 seconds or more.

The experiment was repeated with a second heterogeneous microbial culture. In this Experiment, some growth was seen in samples exposed to UV from 2 lamps even after 1 minutes exposure, as shown in Table 1. As in Experiment 1, irradiation with 8 tubes for 5 seconds increased microbial reduction compared to that observed with 4 tubes for the same time, but there was little further benefit in increasing to 12 tubes.

The effect on samples inoculated with *E.coli* is shown in Table 2. The results with this potential pathogen were directly comparable to those with the hererogenous culture in Experiment 2 above.

Tables 3 and 4 show the effect of 5 or 10 seconds exposure to different lamp numbers on plate counts from samples inoculated with heterogenous or *E.coli* culture, respectively. In these experiments, the inocula were added at 10-fold (*E.coli*) or 100-fold (hererogenous culture) the concentration of the earlier experiments. A 5 second exposure with 8 or 12 lamps caused a 3–4 log cycle reduction in microbial numbers.

As a further test of the effectiveness of the UV irradiation tunnel, *E.coli*-inoculated meat samples exposed to 2, 4, 8, or 12 lamps for 10 seconds were stored for 4 days. Meat samples that had been inoculated but not irradiated were used as controls. At the end of the storage period, the untreated samples had a distinct smell of lipid oxidation and putrefaction. No colour or smell defects were noted in any of the treated samples.

In this series of experiments, none of the samples treated in the irradiation tunnel had a measurable increase in surface temperature as a result of treatment.

Example 2

The earlier discussion of some ways of ameliorating the effects of contact points between foodstuff and conveyor illustrates a feature of the invention: any equipment that operates entirely within the tunnel is itself being continually exposed to biocidal irradiation. For practical purposes such equipment, once sterilised by the UV, will not act as a source of recontamination of treated food. A consideration of the passage of a foodstuff item (a beef steak in this example) through an irradiation tunnel can illustrate this point.

In this example a first continuous belt conveyor extends from outside the entrance to an irradiation tunnel to about midway through the tunnel, at which point the foodstuffs transfer to a second continuous belt conveyor. The interstices of the mesh of the second belt are staggered relative to those of the first.

When a steak is placed on the mesh of the first conveyor the steak, the area of the mesh around the steak but not in contact with it, and the contact points between the mesh and the steak, potentially all harbour microbes. When the steak enters the tunnel it is exposed to UV rays from all sides, as is the mesh of the belt of the first conveyor. Microbes present on either the exposed surfaces of the steak or those of the mesh of the belt are gradually destroyed. However, the contact points between the steak and the belt receive no irradiation and any microbes there will persist.

The steak eventually transfers to the second conveyor. The mesh of the second belt has been sterilised by its progress through the irradiation tunnel prior to the point of transfer of the steak from the first conveyor. Because the interstices of the mesh of the second conveyor are staggered relative to those of the first, the new contact points are solely between sterilised surfaces. However, the few remaining microbes present on the surface of the steak at the initial contact points between the steak and the mesh of the first conveyor are now exposed to UV and are destroyed.

Example 3

As so far described, the microbial reduction achieved on the foodstuff could be wasted by recontamination after UV treatment, for example through negligent handling, airborne microbes, or contact with equipment. The invention can be used to provide a near-aseptic system for the surface sterilisation and aseptic packaging of foodstuffs such as fresh and processed meats by including automated packaging apparatus within the tunnel. This will ensure against post-treatment contamination because: 1) the surfaces of the packaging apparatus will be sterilised by the continual irradiation with UV from all sides; 2) any microbes contaminating the inside of a bag will be eliminated by UV radiation passing through the mouth of the bag; and 3) any contamination physically removed from within a bag during air evacuation, which would normally be discharged from the vacuum pump back into the air of the plant where it could recontaminate, will be sterilised.

Figure 11:
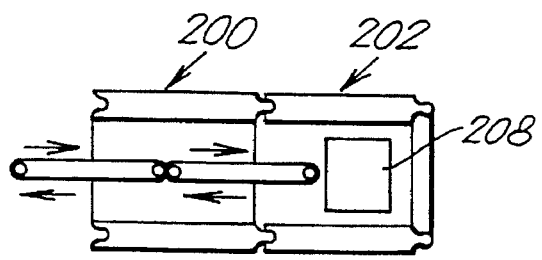
FIG. 11 is a schematic side view of a combined sterilising and packaging system embodying the invention.

An irradiation tunnel as shown in FIG. 11 was constructed by linking two basic unit chambers 200, 202 sequentially, with each of the units being provided with twelve UV lamps of the type described in Example 1. A first continuous belt conveyor 204 extended from outside the entrance to the tunnel to about midway inside the first chamber 200. A second continuous belt conveyor 206 with a mesh with interstices staggered relative to those of the first conveyor continued the line from the discharge end of the first conveyor to a packaging machine 208, in this example a CVP Freshlife Case Ready Z1200 packing machine (CVP Systems, Inc), located in the tunnel's second chamber 202. The distance from the lamps in the first chamber to the upper surface of the belt conveyors was about 20", with a similar distance between the lamps of the second chamber of the tunnel and the midpoint of a bag when in position to receive meat.

All twenty-four lamps in the tunnel were turned on and allowed to run for a few minutes to sterilise the inside of the tunnel. Fresh loins of pork were then placed on the mesh of the first conveyor and moved into the tunnel. Inside the tunnel, all exposed surfaces of the loins were exposed to comparable amounts of UV radiation, apart from at the contact points between the under surface of each loin and the mesh of the belt. On transferring to the second conveyor these areas were exposed to irradiation sufficient to reduce the microbial contamination at the initial contact points to acceptable levels. Dwell time to this point was 5–20 seconds.

The loins of pork transferred automatically to a bulk meat bag until a pre-determined weight was reached (4–6 loins to a bag) at which point the bag moved to the packing station of the Z1200. A second bag moved to the receive position at the discharge end of the second conveyor and the process was repeated.

At the packing station, snorkels extended from the Z1200 into the mouth of the first bag. A pair of rubber-lined jaws were closed around the mouth of the bag and the snorkels, sealing the mouth of the bag. The air inside the bag was evacuated for about 5 seconds using a vacuum pump connected to the snorkels, after which about 15 liters of a mixture of gases (of which $CO_2$ was at least 40% and oxygen between 0.5–10%) was introduced. The snorkels were removed from the bag's mouth, and the bag was sealed for about 5.5. seconds (3.5 heat 2.5 cool). At the end of this packing cycle, the bag moved from the radiation tunnel and was boxed for despatch.

The effect of surface weep on reducing the effectiveness of UV irradiation was apparent in these trials. Greatest reduction in microbial numbers was achieved on loins that showed no weep, and on loins which had been lightly dried before entering the irradiation tunnel.

Example 4

The two continuous belt conveyors used within the irradiation tunnel of Example 3 were removed from the tunnel and replaced by an apparatus comprising a vibrating mesh belt conveyor linking at its discharge end with a steel chute connected to a net weight dispenser. Freshly cut and prepared salad ingredients were placed on the belt outside the tunnel, moved through the tunnel's entrance, and irradiated. The vibrating belt continuously exposed new food surfaces to the radiation, overcoming the potential problem of contact points. At the discharge end of the conveyor the salad ingredients slid down the chute into the net weight dispenser. Dwell time to this point was 5–20 seconds. When about 5 lb of salad ingredients had entered the dispenser the charge was released into a bag positioned beneath the chute. The packaging material of the bag was sufficiently permeable to oxygen to ensure anaerobic conditions (which could encourage spoilage) would not occur within the package. The filled bag then moved to the packaging station and the snorkels were introduced. Because of the delicate nature of some of the ingredients and the risk of enhancing spoilage a vacuum time of 2 seconds was used. The bag was sealed (2–3 seconds) and moved from the tunnel for boxing and dispatch.

The shelf life of pre-packaged salads is usually determined by growth of moulds, especially Botrytis. In this example, the shelf-life of the packs was excellent.

Example 5

An apparatus according to the present invention can also be used to sterilise equipment which would in normal circumstances be the source of recontamination of a foodstuff after it has received some process which reduces its microbial numbers. Such a use is, of course, not confined to foodstuffs after UV irradiation, as it is equally well suited to preventing recontamination of heat treated foodstuffs, for example.

In the manufacture of so-called skinless sausages, for example, the sausage meat is first enclosed in a casing and the sausages so formed are cooked, often to a sterilising temperature. This process heat-sets the sausage sufficiently such that the casing may be removed using an apparatus which slits the casing of each sausage along its length. Although the microbial load of the heat-set meat matrix will have been considerably reduced by smoking, inevitably the water used for shower-chilling, the blade of the casing slitter, the air, and the conveying machinery, will all harbour microbes which can recontaminate the sausages.

The meat block of a conventional Frankfurter formulation (comprising 60 lbs bull F.C., 20 lbs lean pork trim, 20 lb regular pork trim) was pre-ground and then transferred to the bowl of a silent cutter. The mix was given an initial chop on slow speed, with the addition of 2.5 lb salt, 3.5 lb cereal flour, and a curing spice mix containing 0.25 ounces sodium nitrite, 3 ounces sodium nitrate, 1.5 ounces mace, and 3.7 ounces white pepper, and a little water. The brat was then made at high speed, with further gradual addition of ice/water to a total of 25 lbs.

The sausage meat was filled into casings and linked.

The links were placed in a smokehouse and smoked to an internal temperature of about 68° C. They were then showerchilled to about 30° C.

The chilled links were placed on a chain feeder which extended into an irradiation tunnel. The chain feeder discharged the links within the tunnel under irradiation to an automatic casing slitter. After slitting and peeling under continuous irradiation, the skinless sausages were bulkpacked, the packs were sealed, and moved from the chamber for boxing and dispatch.

Example 6

An irradiation tunnel was constructed as described for Example 3. A continuous belt conveyor was used to support beef steaks during irradiation in the first chamber of the tunnel, as before. At the end of this first conveyor, the beef steaks were over-wrapped as for conventional retail display, except of course this over-wrapping was conducted under continuous irradiation. The over-wrapped retail cuts then transferred in suitable numbers to "masterbags", that is barrier bags suitable for containing a number of overwrapped retail cuts of meat. Each masterbag moved in sequence to a packing station similar to that of Example 3, where the air was evacuated from the bag and a modified atmosphere injected prior to sealing. Sealed bags moved from the irradiation tunnel and were boxed for despatch.

Continuing experimentation confirms the effectiveness of the invention in combatting dangerous pathogens. In particular, we have demonstrated effectiveness in dealing with *Campylobacter jejuni, Escherischia coli* 0157:H7, *Listeria monocytogenes, Salmonella typhimurium,* and *Staphylococcus aureus.*

In further experiments, various meat cuts were subjected to (a) no sterilization treatment; (b) treatment according to the invention with UV lamps approximately 48 cm from the meat surface ("far") or (c) treatment according to the invention with UV lamps approximately 30 cm from the meat surface ("near"). The meat was then packaged either in a vacuum pack or in a gas flushed pack. The number of days required for the aerobic or anaerobic microorganism count to reach $1 \times 10^6$ counts (generally acknowledged as a level rendering the package unfit for sale) was determined. The results are shown in Table 5. It is clear that, in every case, treatment according to the invention can give substantially enhanced shelf life (though care may be required in selecting a suitable lamp spacing).

TABLE 1

Plate Counts from Meat Samples inoculated with heterogenous microbial cultures and exposed to U.V. treatment for various times.

| No. of lamps | Repli-cate | Length of Treatment (in Seconds) | | | | |
|---|---|---|---|---|---|---|
| | | 5 | 10 | 20 | 40 | 60 |
| Experiment 1 | | | | | | |
| 4 | a | 20 | 1 | 0 | 0 | 0 |
| | b | 10 | 1 | 0 | 0 | 0 |
| 8 | a | 0 | 0 | 0 | 0 | 0 |
| | b | 0 | 0 | 0 | 0 | 0 |
| 12 | a | 0 | 0 | 0 | 0 | 0 |
| | b | 0 | 0 | 0 | 0 | 0 |
| Untreated | | 605 | 605 | 615 | 590 | 600 |
| Experiment 2 | | | | | | |
| 2 | a | 250 | 9 | 0 | 1 | 1 |
| | b | 258 | 9 | 1 | 0 | 1 |
| 4 | a | 168 | 0 | 0 | 1 | 0 |
| | b | 100 | 3 | 0 | 0 | 0 |
| 8 | a | 1 | 0 | 0 | 0 | 0 |
| | b | 1 | 0 | 0 | 0 | |
| 12 | a | 0 | 0 | 0 | 0 | 0 |
| | b | 0 | 0 | 0 | 0 | 0 |
| Untreated | a | 578 | 593 | 603 | 595 | 582 |
| | b | 738 | 695 | 713 | 705 | 726 |

TABLE 2

Plate Counts from Meat Samples inoculated with E. coli and exposed to U.V. treatment for various times.

| No. of lamps | Repli-cate | Length of Treatment (in Seconds) | | | | |
|---|---|---|---|---|---|---|
| | | 5 | 10 | 20 | 40 | 60 |
| Experiment 1 | | | | | | |
| 2 | a | 222 | 5 | 0 | 0 | 0 |
| | b | 147 | 5 | 0 | 0 | 0 |
| 4 | a | 52 | 1 | 0 | 0 | 1 |
| | b | 26 | 0 | 0 | 0 | 0 |
| 8 | a | 3 | 1 | 1 | 0 | 0 |
| | b | 0 | 0 | 0 | 0 | 0 |
| 12 | a | 3 | 0 | 1 | 0 | 0 |
| | b | 1 | 2 | 0 | 0 | 0 |
| Untreated | | 1132 | 1088 | 1099 | 1076 | 1154 |

TABLE 3

Plate Counts from Meat Samples inoculated with concentrated heterogenous microbial culture and exposed to U.V. treatment for various times.

| No. of tubes | Length of Treatment (in Seconds) | |
|---|---|---|
| | 5 | 10 |
| 2 | >6000 | 122 |
| 4 | >4000 | 136 |
| 8 | 180 | 22 |

TABLE 3-continued

Plate Counts from Meat Samples inoculated with concentrated heterogenous microbial culture and exposed to U.V. treatment for various times.

| No. of tubes | Length of Treatment (in Seconds) | |
|---|---|---|
| | 5 | 10 |
| 12 | 40 | 17 |
| Untreated | >50,000 | >50,000 |

TABLE 4

Plate Counts from Meat Samples inoculated with concentrated E. coli culture and exposed to U.V. treatment for various times.

| No. of tubes | Length of Treatment (in Seconds) | |
|---|---|---|
| | 5 | 10 |
| 2 | 166 | 4 |
| 4 | 30 | 2 |
| 8 | 1 | 1 |
| 12 | 2 | 2 |
| Untreated | 2690 | 2610 |

TABLE 5

| | Vacuum Pack | | | Gas Flushed | | |
|---|---|---|---|---|---|---|
| | Untreated | Far | Near | Untreated | Far | Near |
| (Days to $1 \times 10^6$ Aerobic Counts) | | | | | | |
| Loin | 30 | 34 | 44 | 35 | 53 | 70+ |
| Tenderloin | 23 | 45 | 37 | 38 | 32 | 49 |
| Shank | 25 | 28 | 38 | 40 | 52 | 40 |
| (Days to $1 \times 10^6$ Anaerobic Counts) | | | | | | |
| Loin | 22 | 39 | 39 | 34 | 45 | 70+ |
| Tenderloin | 27 | 44 | 39 | 42 | 30 | 49 |
| Shank | 21 | 28 | 32 | 38 | 46 | 70+ |

I claim:

1. A method of sterilizing an edible substrate comprising conveying the substrate in a non-wrapped state into a treatment cavity and subjecting substantially the entire surface of said substrate to UV irradiation, said method further comprising (i) conveying the substrate into the treatment cavity by a conveyor means which supports the substrate at regions of contact and which comprises a metal mesh conveyor belt that carries the substrate in a conveying direction, and (ii) displacing the substrate transversely of the conveying direction by contacting the substrate with at least one baffle as the substrate is conveyed by said conveyor means such that said regions of contact on the substrate are changed as the substrate is being conveyed, whereby said regions of contact do not escape irradiation.

2. A method according to claim 1 wherein the substrate is an uncooked, unpackaged foodstuff.

3. A method according to claim 1 wherein the radiation falls essentially exclusively in the wavelength range of 220–300 nm.

* * * * *